US012694175B2

(12) United States Patent     (10) Patent No.:   US 12,694,175 B2

Ogawa et al.     (45) Date of Patent:     Jul. 28, 2026

(54) SPRINGBACK-AMOUNT-DISCREPANCY-CAUSING-PORTION SPECIFYING METHOD AND DEVICE

(71) Applicant: JFE STEEL CORPORATION, Tokyo (JP)

(72) Inventors: Takeshi Ogawa, Tokyo (JP); Masaki Urabe, Tokyo (JP); Eiji Iizuka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 1284 days.

(21) Appl. No.: 17/613,386

(22) PCT Filed: Apr. 22, 2020

(86) PCT No.: PCT/JP2020/017379

§ 371 (c)(1),
(2) Date: Nov. 22, 2021

(87) PCT Pub. No.: WO2020/235288

PCT Pub. Date: Nov. 26, 2020

(65) Prior Publication Data

US 2022/0222398 A1     Jul. 14, 2022

(30) Foreign Application Priority Data

May 22, 2019    (JP) ................................. 2019-095824

(51) Int. Cl.
   *G06F 30/23*      (2020.01)
   *B21D 22/00*      (2006.01)
        (Continued)

(52) U.S. Cl.
   CPC ............. *G06F 30/23* (2020.01); *B21D 22/00* (2013.01); *G06F 2119/14* (2020.01); *G06F 2119/18* (2020.01)

(58) Field of Classification Search
CPC .. G06F 30/23; G06F 2119/18; G06F 2119/14; G06F 2111/10; B21D 22/00
See application file for complete search history.

(56) References Cited

U.S. PATENT DOCUMENTS

2010/0005845 A1    1/2010   Yoshida et al.
2011/0246150 A1    10/2011   Miyagi et al.
        (Continued)

FOREIGN PATENT DOCUMENTS

CN       101811156 A    8/2010
CN       102264486 A    11/2011
        (Continued)

OTHER PUBLICATIONS

Hiramoto, "Improvement of Shape Accuracy in Press-Formed Product of High-Strength Steel by Determining Springback Driving Stress", 2015, Google provided machine translation (Year: 2015).*

(Continued)

*Primary Examiner* — David A Hopkins
(74) *Attorney, Agent, or Firm* — Oliff PLC

(57)         ABSTRACT

A method and device for specifying a portion causing a discrepancy in springback amount between CAE analysis and an actual formed product. The method includes a formed-product-driving-stress-distribution acquisition step of acquiring a driving stress distribution of a press-formed product, an analysis-driving-stress-distribution acquisition step of acquiring a driving stress distribution in springback analysis, a formed-product springback-amount acquisition step of acquiring a springback amount based on the formed product driving stress distribution, a stress-substituted-springback-amount acquisition step of substituting a value of analysis driving stress in a region with a value of formed product driving stress in a corresponding region and acquiring a springback amount based on a stress substituted distribution obtained by the substitution, and a springback- (Continued)

amount-discrepancy-causing-portion specifying step of finding a difference between the formed product springback amount and the stress substituted springback amount and specifying, based on the difference found, a portion causing a discrepancy in springback amount.

6 Claims, 13 Drawing Sheets

(51) Int. Cl.
  *G06F 119/14* (2020.01)
  *G06F 119/18* (2020.01)

(56) References Cited

U.S. PATENT DOCUMENTS

| | | | |
|---|---|---|---|
| 2015/0168240 A1 | 6/2015 | Sumikawa et al. | |
| 2016/0288184 A1 | 10/2016 | Zhao et al. | |
| 2022/0219217 A1* | 7/2022 | Ogawa .................... | G01B 21/20 |

FOREIGN PATENT DOCUMENTS

| | | | |
|---|---|---|---|
| EP | 2058062 A1 | 5/2009 | |
| EP | 2371464 A1 | 10/2011 | |
| JP | 2007-229724 A | 9/2007 | |
| JP | 2009-172677 A | 8/2009 | |
| JP | 2012-206158 A | 10/2012 | |
| JP | 2013-071120 A | 4/2013 | |
| JP | 2014-065056 A | 4/2014 | |
| JP | 2016-193455 A | 11/2016 | |
| KR | 101088115 B1 | 12/2011 | |

OTHER PUBLICATIONS

Hiramoto, Jiro, et al. "Improvement of Shape Accuracy in Press-Formed Parts of High-Strength Steel by Springback-Root-Cause Analysis." Key Engineering Materials 725 (2017): 610-615. See pp. 610-613, incl. the abstract. (Year: 2017).*

Hiramoto, Jiro, et al. "Simple springback cause analysis using measured shapes of dies and pressed part." Key Engineering Materials 725 (2017): 683-688. See pp. 683-685 including the abstract and figures 1-2, and their accompanying description. (Year: 2017).*

Carden, W. D., et al. "Measurement of springback." International Journal of Mechanical Sciences 44.1 (2002): 79-101 (Year: 2002).*

Odenberger, Eva-Lis, Robert Pederson, and Mats Oldenburg. "Finite element modeling and validation of springback and stress relaxation in the thermo-mechanical forming of thin Ti-6AI-4V sheets." The International Journal of Advanced Manufacturing Technology 104 (2019): 3439-3455 (Year: 2019).*

Firat, Mehmet, Bilgin Kaftanoglu, and Orhan Eser. "Sheet metal forming analyses with an emphasis on the springback deformation." Journal of materials processing technology 196.1-3 (2008): 135-148 (Year: 2008).*

Burchitz, I. A. "Springback, improvement of its predictability: Literature study report." (2005). Netherlands Institute for Metals Research. Chapter 1, p. 9, ¶¶ 1-2, then § 1.2 ¶ 1, then § 2.1 ¶ 1 (Year: 2005).*

Gan, Wei, and R. H. Wagoner. "Die design method for sheet springback." International Journal of Mechanical Sciences 46.7 (2004): 1097-1113. Abstract; and § 1.1 ¶¶ 1-2. (Year: 2004).*

Sep. 13, 2023 Office Action issued in Korean Patent Application No. 10-2021-7037893.

Park, J. S. et al., "Improvement in Prediction Accuracy of Springback for Stamping CAE Considering Tool Deformation", Transactions of Materials Processing, vol. 23, No. 6, pp. 380-385, Oct. 1, 2014.

Jul. 14, 2020 International Search Report issued in International Application No. PCT/JP2020/017379.

Jun. 10, 2022 Extended European Search Report issued in European Patent Application No. 20809819.4.

Jan. 10, 2025 Office Action issued in Chinese Patent Application No. 202080037875.2 (with concise explanation in English).

Liu et al. "Research on Rebounding Deformation of Offset Strip Fin Based on ANSYS", China Academic Journal Electronic Publishing House, pp. 39-51, Apr. 2013.

Apr. 17, 2025 Office Action issued in European Patent Application No. 20809819.4.

\* cited by examiner

POSITIONING PIN

920mm

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

10

(a) CAE DRIVING
STRESS DISTRIBUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

10

(b) ACTUAL PANEL
STRESS DISTRIBUTION

STRESS (MPa)
3.000e+02
2.400e+02
1.800e+02
1.200e+02
6.000e+01
0.000e+00
-6.000e+01
-1.200e+02
-1.800e+02
-2.400e+02
-3.000e+02

10

(c) DIFFERENCE BETWEEN (CAE STRESS) AND (ACTUAL PANEL STRESS)

(a) CAE DRIVING STRESS (b) ACTUAL PANEL STRESS (a) CAE STRESS DISTRIBUTION (b) ACTUAL PANEL STRESS DISTRIBUTION (c) STRESS DISTRIBUTION AFTER B-1 STRESS SUBSTITUTION (a) STRESS DISTRIBUTION AFTER B-1 STRESS SUBSTITUTION

⇩ SPRINGBACK ANALYSIS (b) DISPLACEMENT (a) CAE STRESS DISTRIBUTION (b) ACTUAL PANEL STRESS DISTRIBUTION (c) STRESS DISTRIBUTION AFTER B-2 STRESS SUBSTITUTION

FIG. 13

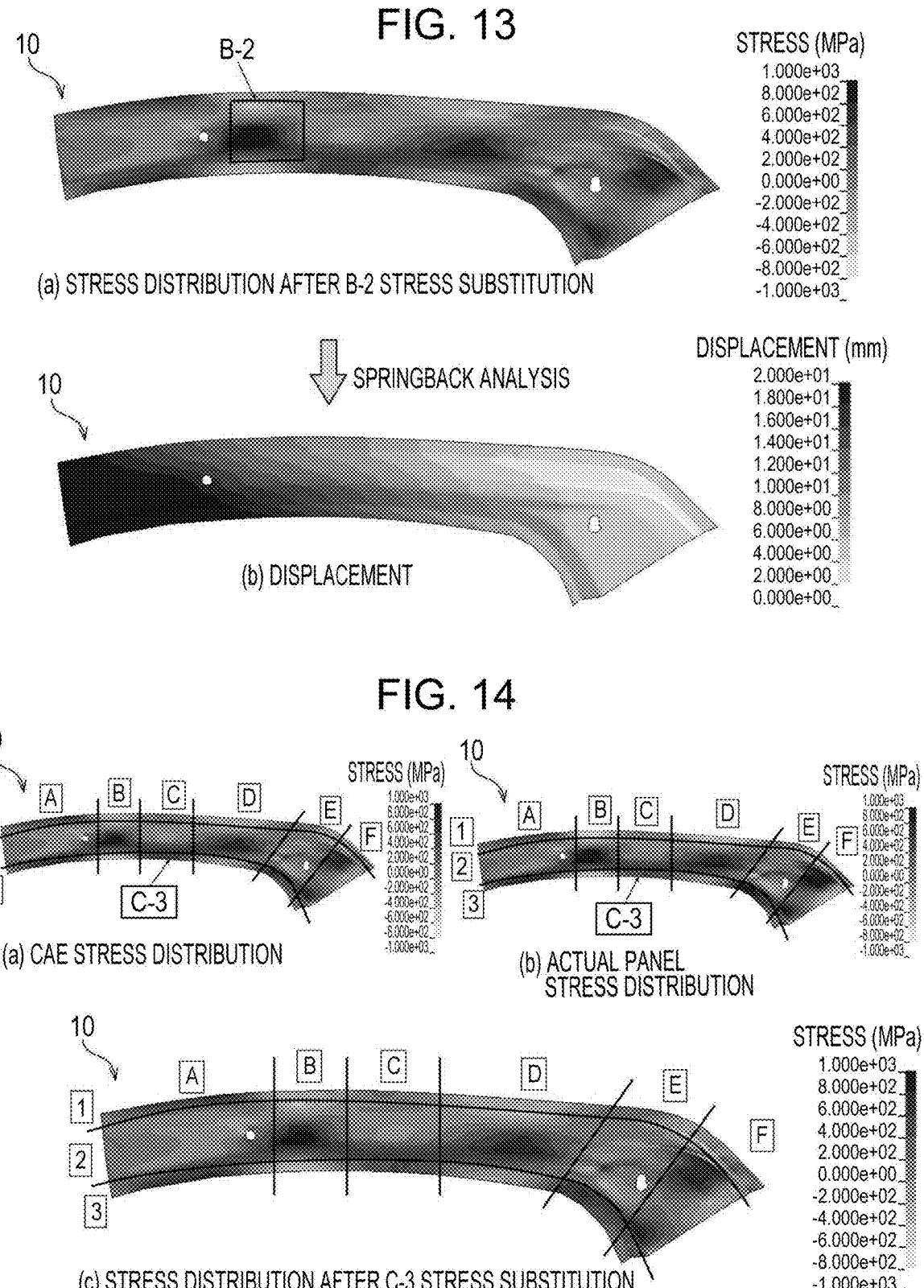

(a) STRESS DISTRIBUTION AFTER B-2 STRESS SUBSTITUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

⬇ SPRINGBACK ANALYSIS (b) DISPLACEMENT

DISPLACEMENT (mm)
2.000e+01
1.800e+01
1.600e+01
1.400e+01
1.200e+01
1.000e+01
8.000e+00
6.000e+00
4.000e+00
2.000e+00
0.000e+00

FIG. 14

(a) CAE STRESS DISTRIBUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

(b) ACTUAL PANEL STRESS DISTRIBUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

(c) STRESS DISTRIBUTION AFTER C-3 STRESS SUBSTITUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

FIG. 15

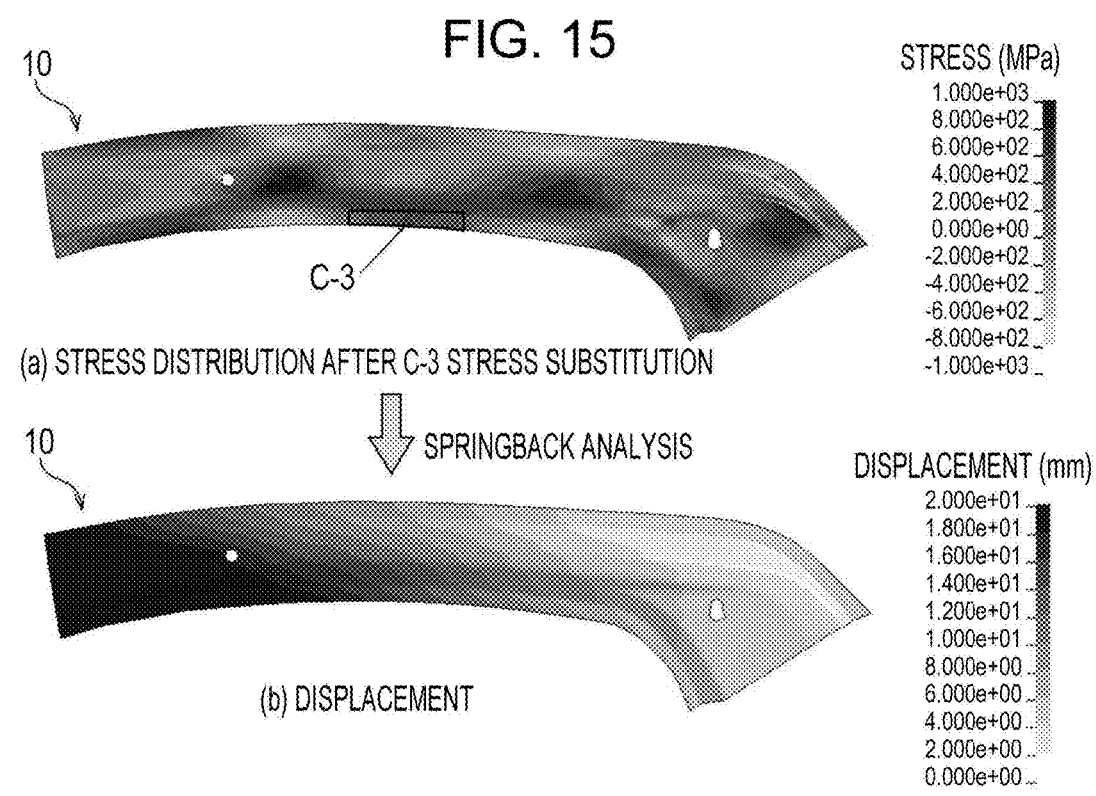

(a) STRESS DISTRIBUTION AFTER C-3 STRESS SUBSTITUTION

SPRINGBACK ANALYSIS (b) DISPLACEMENT

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

DISPLACEMENT (mm)
2.000e+01
1.800e+01
1.600e+01
1.400e+01
1.200e+01
1.000e+01
8.000e+00
6.000e+00
4.000e+00
2.000e+00
0.000e+00

FIG. 16

(a) CAE STRESS DISTRIBUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

(b) ACTUAL PANEL STRESS DISTRIBUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

(c) STRESS DISTRIBUTION AFTER D-2 STRESS SUBSTITUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

(a) STRESS DISTRIBUTION AFTER D-2 STRESS SUBSTITUTION

SPRINGBACK ANALYSIS (b) DISPLACEMENT (a) CAE STRESS DISTRIBUTION (b) ACTUAL PANEL STRESS DISTRIBUTION (c) STRESS DISTRIBUTION AFTER E-2 STRESS SUBSTITUTION

FIG. 19

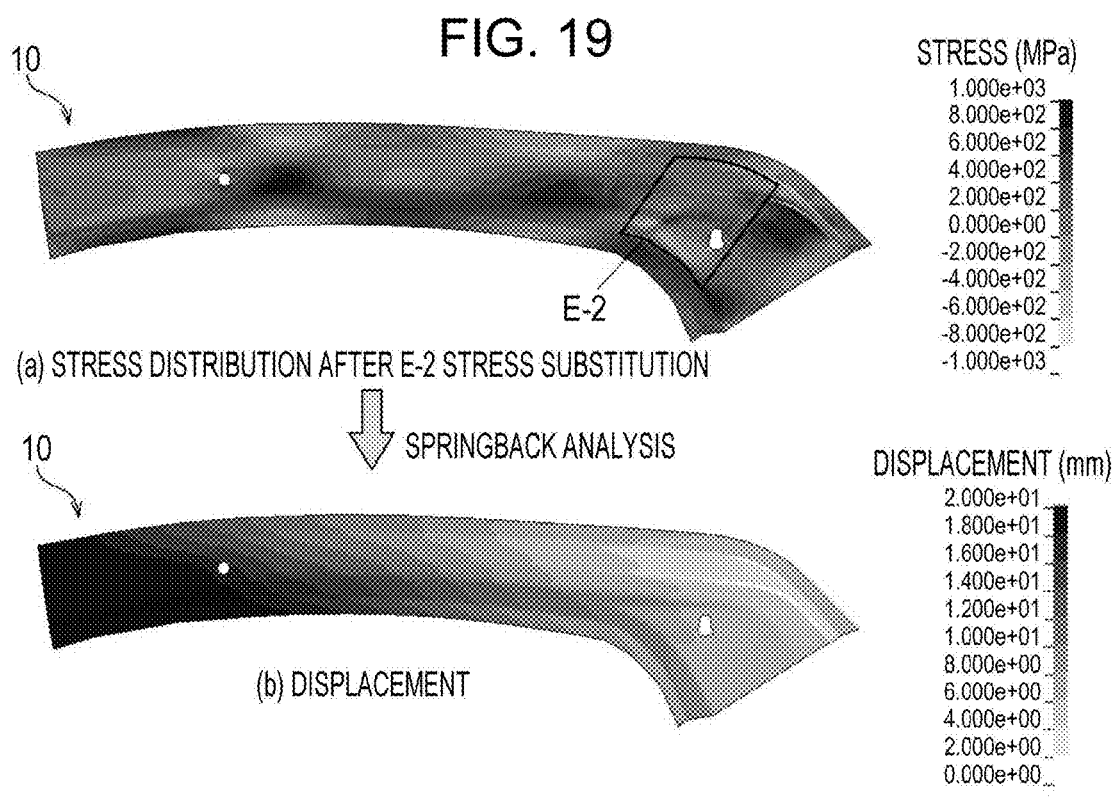

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

E-2

(a) STRESS DISTRIBUTION AFTER E-2 STRESS SUBSTITUTION

⬇ SPRINGBACK ANALYSIS

DISPLACEMENT (mm)
2.000e+01
1.800e+01
1.600e+01
1.400e+01
1.200e+01
1.000e+01
8.000e+00
6.000e+00
4.000e+00
2.000e+00
0.000e+00

(b) DISPLACEMENT

FIG. 20

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

D-2/E-2

(a) CAE STRESS DISTRIBUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

D-2/E-2

(b) ACTUAL PANEL
STRESS DISTRIBUTION

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

(c) STRESS DISTRIBUTION AFTER D-2/E-2 STRESS

FIG. 21

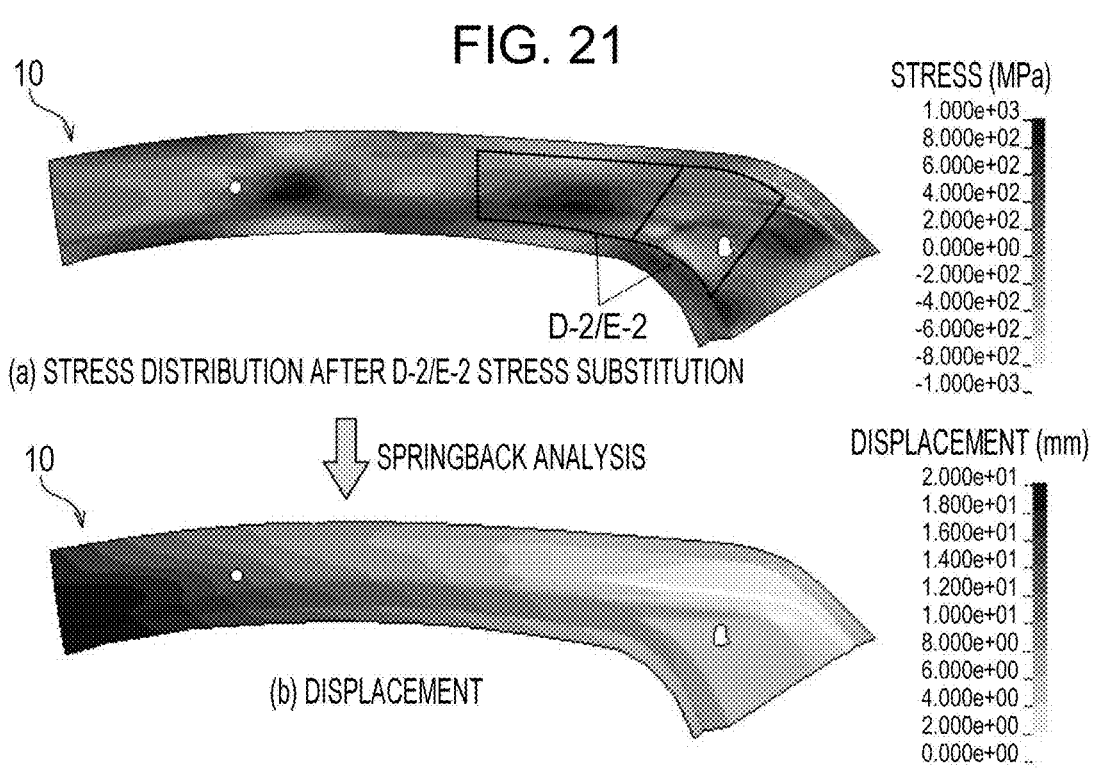

10

STRESS (MPa)

1.000e+03
8.000e+02
6.000e+02
4.000e+02
2.000e+02
0.000e+00
-2.000e+02
-4.000e+02
-6.000e+02
-8.000e+02
-1.000e+03

D-2/E-2

(a) STRESS DISTRIBUTION AFTER D-2/E-2 STRESS SUBSTITUTION

⇩ SPRINGBACK ANALYSIS

10

DISPLACEMENT (mm)

2.000e+01
1.800e+01
1.600e+01
1.400e+01
1.200e+01
1.000e+01
8.000e+00
6.000e+00
4.000e+00
2.000e+00
0.000e+00

(b) DISPLACEMENT

STRESS (MPa)

1.000e+03
8.000e+02
6.000e+02
4.000e+02
2.000e+02
0.000e+00
-2.000e+02
-4.000e+02
-6.000e+02
-8.000e+02
-1.000e+03

F-2

(a) CAE STRESS DISTRIBUTION

10

A   B   C   D   E   F 1
2
3

STRESS (MPa)

1.000e+03
8.000e+02
6.000e+02
4.000e+02
2.000e+02
0.000e+00
-2.000e+02
-4.000e+02
-6.000e+02
-8.000e+02
-1.000e+03

F-2

(b) ACTUAL PANEL STRESS DISTRIBUTION

10

A   B   C   D   E   F 1
2
3

STRESS (MPa)

1.000e+03
8.000e+02
6.000e+02
4.000e+02
2.000e+02
0.000e+00
-2.000e+02
-4.000e+02
-6.000e+02
-8.000e+02
-1.000e+03

(c) STRESS DISTRIBUTION AFTER F-2 STRESS SUBSTITUTION (a) STRESS DISTRIBUTION AFTER F-2 STRESS SUBSTITUTION

SPRINGBACK ANALYSIS (b) DISPLACEMENT

STRESS (MPa)
1.000e+03
8.000e+02
6.000e+02
4.000e+02
2.000e+02
0.000e+00
-2.000e+02
-4.000e+02
-6.000e+02
-8.000e+02
-1.000e+03

DISPLACEMENT (mm)
2.000e+01
1.800e+01
1.600e+01
1.400e+01
1.200e+01
1.000e+01
8.000e+00
6.000e+00
4.000e+00
2.000e+00
0.000e+00

SPRINGBACK-AMOUNT-DISCREPANCY-CAUSING-PORTION SPECIFYING METHOD AND DEVICE

TECHNICAL FIELD

This application relates to a springback-amount-discrepancy-causing-portion specifying method and device for specifying a portion of a press-formed product that causes a discrepancy between a springback amount of the press-formed product of an actual panel and a springback amount obtained by CAE analysis.

BACKGROUND

A product formed by press-forming a metal sheet is required to have high shape accuracy. To satisfy the requested shape accuracy, it is important to reduce springback that occurs due to elastic deformation of a formed product taken out of a forming die after press forming.

Since internal stress of a formed product at a bottom dead center affects behavior of springback, grasping which portion of the formed product has stress that affects springback and how the stress affects springback is effective in taking a countermeasure against springback.

As such a method, Patent Literature 1 discloses a press forming analysis method in which analysis is conducted by using a finite element method.

According to the press forming analysis method disclosed in Patent Literature 1, "since how a defined amount concerning springback changes is calculated before and after a change of a residual stress distribution in a certain region of a certain forming target object which is a press-formed product, influence of residual stress in the certain region of the forming target object before release from a die on springback can be estimated on the basis of a result of the calculation" (see Effects of Invention).

Using a method such as the one disclosed in Patent Literature 1 makes it possible to consider a countermeasure against springback before creation of an actual forming die and to markedly lessen forming die adjusting work for assuring shape accuracy.

As another springback cause analysis method using CAE analysis, Patent Literature 2 discloses a method for conducting more appropriate evaluation by calculating springback (SB) effective stress from residual stress before release from a die and residual stress after the release from the die and analyzing a cause by using the SB effective stress.

According to the above methods, springback analysis is conducted on the basis of a stress state calculated from data settings in CAE analysis. Meanwhile, Patent Literature 3 discloses a method for conducting more accurate evaluation by importing a measured three-dimensional shape created by measuring a surface shape of an actually press-formed product into CAE analysis, acquiring a stress distribution state by conducting mechanical analysis in a state where the measured three-dimensional shape is held in a forming die model to a forming bottom dead center state, and analyzing a cause by using the stress distribution state.

CITATION LIST

Patent Literature

PTL 1: Japanese Unexamined Patent Application Publication No. 2007-229724
PTL 2: Japanese Unexamined Patent Application Publication No. 2012-206158

PTL 3: Japanese Unexamined Patent Application Publication No. 2013-71120

SUMMARY

Technical Problem

However, even in a case where a product is press-formed by using a forming die produced by taking a countermeasure against springback based on CAE analysis, the actual press-formed product sometimes has a shape different from a shape expected from the countermeasure.

This can happen, for example, in a case where a forming load assumed in the CAE analysis is not applied to a metal sheet or a stress state before release from a die cannot be accurately reproduced in the CAE analysis due to a shape of the forming die used for the press forming or various forming conditions. In such a case, it is necessary to adjust the forming die used for the press forming or forming conditions or to revise settings of the CAE analysis or a shape of the forming die.

Such adjustment work requires specifying which portion of a formed product has a root cause for a discrepancy between a springback analysis result obtained by CAE analysis and a springback amount of an actual formed product, but the methods disclosed in Patent Literature 1 to 3 are not a method for specifying a portion that causes a discrepancy between CAE analysis and an actual springback amount but a method for specifying a portion that causes springback itself.

Furthermore, in order to assure usefulness of a countermeasure against springback using CAE analysis, it is required to improve reproducibility of springback analysis so that a discrepancy from springback of an actual formed product does not occur. Also in this respect, it is necessary to specify a portion of a formed product that causes the discrepancy.

The disclosed embodiments have been accomplished to solve the above problems, and an object of the disclosed embodiments is to provide a springback-amount-discrepancy-causing-portion specifying method and device for specifying a portion of a press-formed product that causes a discrepancy between a springback amount of the press-formed product of an actual panel and a springback amount of CAE analysis.

Solution to Problem

In press forming of a press-formed product 10 illustrated as an example in FIG. 2, there sometimes occurs a difference (discrepancy) between a springback amount calculated by springback analysis (also called CAE analysis) conducted before the press forming and a springback amount of an actually press-formed product (also called an actual panel). A portion that causes such a discrepancy in springback amount between CAE analysis and an actual panel is sometimes different from a portion that causes springback itself. Therefore, there is a problem that even in a case where springback is lessened by taking some sort of countermeasure in a portion that causes springback, a discrepancy in springback amount between CAE analysis and an actual panel cannot be reduced.

In view of this, the inventors conducted diligent studies to solve such a problem. As a result, the inventors reached an idea that a discrepancy in springback amount is caused by a difference between stress (hereinafter also referred to as a driving stress distribution) that contributes to springback in CAE analysis and stress (driving stress distribution) that contributes to springback of an actual panel.

The inventors conducted further studies based on this idea and found that a discrepancy amount in springback amount between CAE analysis and an actual panel is influenced not only by a difference in the driving stress, but also by a portion where the difference in the driving stress occurs.

In addition, the inventors found that it is effective to divide a driving stress distribution into a plurality of regions and consider a degree of influence on the discrepancy amount for each of the regions in specifying a portion that causes the discrepancy in springback amount.

The disclosed embodiments were accomplished based on this finding and specifically has the following features.

(1) A springback-amount-discrepancy-causing-portion specifying method according to embodiments is for specifying a portion of a formed product shape that causes a discrepancy between a springback amount occurring in a press-formed product obtained by press-forming an actual panel and a springback amount obtained by conducting springback analysis on an analysis model of a same shape as the press-formed product and includes: a formed-product-driving-stress-distribution acquisition step of creating a press-formed product model from three-dimensional shape measurement data acquired by measuring a surface shape of the press-formed product after release from a die and conducting mechanical analysis in a state where the press-formed product model is held by a forming die model to a bottom dead center to acquire a stress distribution at a forming bottom dead center as a formed product driving stress distribution that contributes to springback of the press-formed product; an analysis-driving-stress-distribution acquisition step of acquiring a bottom dead center stress distribution and a remaining stress distribution after release from a die in the springback analysis and acquiring a difference between the bottom dead center stress distribution and the remaining stress distribution after the release from the die as an analysis driving stress distribution in the springback analysis; a formed-product-springback-amount acquisition step of setting the formed product driving stress distribution in a formed product shape at the bottom dead center in the springback analysis and acquiring a springback amount by performing springback analysis based on the formed product driving stress distribution thus set; a stress-substituted-springback-amount acquisition step of setting the analysis driving stress distribution in the formed product shape at the bottom dead center, substituting a value of analysis driving stress in a region of the analysis driving stress distribution thus set with a value of formed product driving stress in a region of the formed product driving stress distribution corresponding to the region, and acquiring a springback amount by conducting springback analysis based on a stress substituted distribution thus obtained by the substitution; and a springback-amount-discrepancy-causing-portion specifying step of finding a difference between the springback amount acquired in the stress-substituted-spring-back-amount acquisition step and the springback amount acquired in the formed-product-springback-amount acquisition step and specifying, based on the difference thus found, a portion of the formed product shape that causes the discrepancy.

(2) The springback-amount-discrepancy-causing-portion specifying method in (1) further includes a stress-substitution-region selection step of acquiring a stress difference distribution from a difference between the analysis driving stress distribution acquired in the analysis-driving-stress-distribution acquisition step and the formed product driving stress distribution acquired in the formed-product-driving-stress-distribution acquisition step and selecting, from the stress difference distribution, a region having a relatively large difference as the region in which stress substitution is to be performed.

(3) A springback-amount-discrepancy-causing-portion specifying device according to embodiments is for specifying a portion of a formed product shape that causes a discrepancy between a springback amount occurring in a press-formed product obtained by press-forming an actual panel and a springback amount obtained by conducting springback analysis on an analysis model of a same shape as the press-formed product and includes: formed-product-driving-stress-distribution acquisition means for creating a press-formed product model from three-dimensional shape measurement data acquired by measuring a surface shape of the press-formed product after release from a die and conducting mechanical analysis in a state where the press-formed product model is held by a forming die model to a bottom dead center to acquire a stress distribution at a forming bottom dead center as a formed product driving stress distribution that contributes to springback of the press-formed product; analysis-driving-stress-distribution acquisition means for acquiring a bottom dead center stress distribution and a remaining stress distribution after release from a die in the springback analysis and acquiring a difference between the bottom dead center stress distribution and the remaining stress distribution after the release from the die as an analysis driving stress distribution in the springback analysis; formed-product-springback-amount acquisition means for setting the formed product driving stress distribution in a formed product shape at the bottom dead center in the springback analysis and acquiring a springback amount by performing springback analysis based on the formed product driving stress distribution thus set; stress-substituted-springback-amount acquisition means for setting the analysis driving stress distribution in the formed product shape at the bottom dead center, substituting a value of analysis driving stress in a region of the analysis driving stress distribution thus set with a value of formed product driving stress in a region of the formed product driving stress distribution corresponding to the region, and acquiring a springback amount by conducting springback analysis based on a stress substituted distribution thus obtained by the substitution; and springback-amount-discrepancy-causing-portion specifying means for finding a difference between the springback amount acquired by the stress-substituted-springback-amount acquisition means and the springback amount acquired by the formed-product-springback-amount acquisition means and specifying, based on the difference thus found, a portion of the formed product shape that causes a discrepancy in springback amount between the press-formed product and the springback analysis.

(4) The springback-amount-discrepancy-causing-portion specifying device in (3) further includes stress-substitution-region selection means for acquiring a stress difference distribution from a difference between the analysis driving stress distribution acquired by the analysis-driving-stress-distribution acquisition means and the formed product driving stress distribution acquired by the formed-product-driving-stress-distribution acquisition means and selecting, from the stress difference distribution, a region having a relatively large difference as the region in which stress substitution is to be performed.

Advantageous Effects

According to the disclosed embodiments, it is possible to specify a portion that causes a discrepancy in springback amount between springback analysis using CAE analysis and an actual press-formed product, and therefore it is possible to lessen burden of work of adjusting an actual press forming die and forming conditions and to improve usefulness of a countermeasure against springback using CAE analysis.

BRIEF DESCRIPTION OF THE DRAWINGS

FIG. 13 illustrates (a) a stress substituted distribution and (b) displacement calculated by springback analysis based on the stress substituted distribution in Embodiment 1 (region B-2).

FIG. 14 illustrates (a), (b) a region in which driving stress is to be substituted and (c) a stress distribution (stress substituted distribution) obtained after substitution of driving stress in the region in Embodiment 1 (region C-3).

FIG. 15 illustrates (a) a stress substituted distribution and (b) displacement calculated by springback analysis based on the stress substituted distribution in Embodiment 1 (region C-3).

FIG. 16 illustrates (a), (b) a region in which driving stress is to be substituted and (c) a stress distribution (stress substituted distribution) obtained after substitution of driving stress in the region in Embodiment 1 (region D-2).

FIG. 19 illustrates (a) a stress substituted distribution and (b) displacement calculated by springback analysis based on the stress substituted distribution in Embodiment 1 (region E-2).

FIG. 20 illustrates (a), (b) a region in which driving stress is to be substituted and (c) a stress distribution (stress substituted distribution) obtained after substitution of driving stress in the region in Embodiment 1 (region D-2/E-2).

FIG. 21 illustrates (a) a stress substituted distribution and (b) displacement calculated by springback analysis based on the stress substituted distribution in Embodiment 1 (region D-2/E-2).

FIG. 22 illustrates (a), (b) a region in which driving stress is to be substituted and (c) a stress distribution (stress substituted distribution) obtained after substitution of driving stress in the region in Embodiment 1 (region F-2).

DETAILED DESCRIPTION

Embodiment 1

Figure 1:
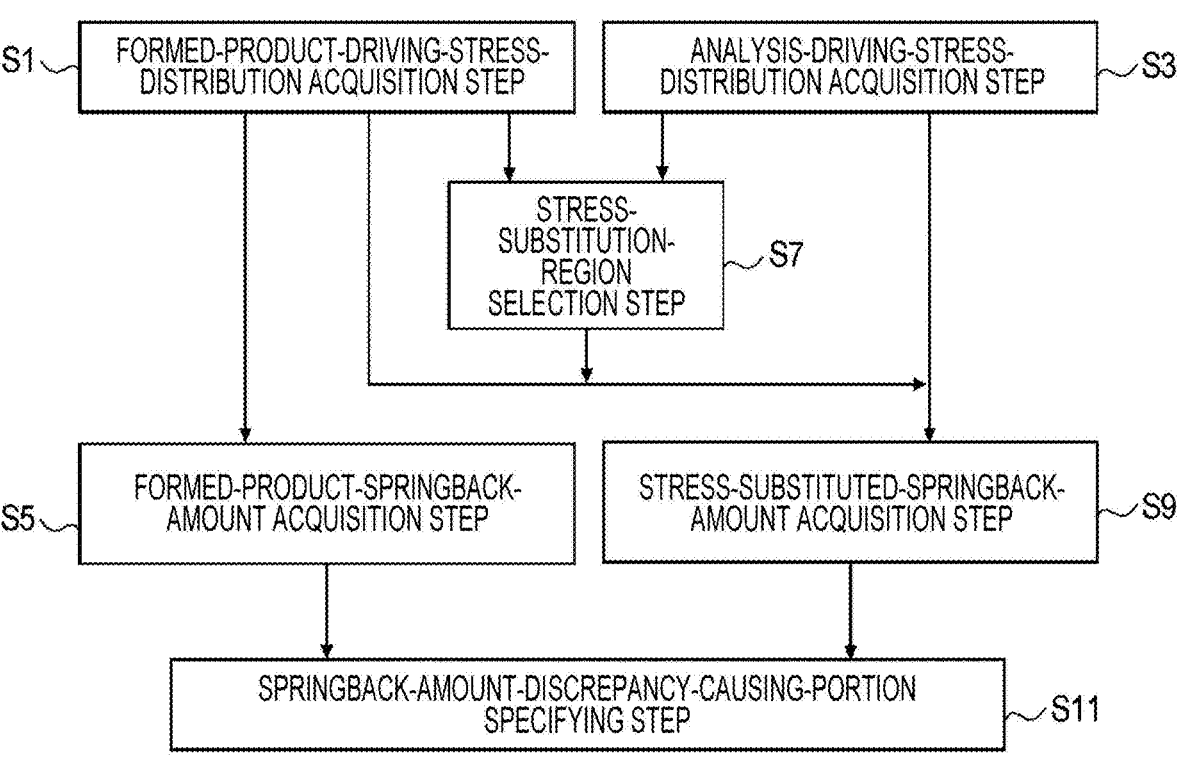
FIG. 1 is a flowchart illustrating flow of processing of a springback-amount-discrepancy-causing-portion specifying method according to Embodiment 1.

A springback-amount-discrepancy-causing-portion specifying method according to Embodiment 1 is a method for specifying a portion of a formed product shape that causes a discrepancy between a springback amount of a press-formed product obtained by press-forming an actual panel and a springback amount obtained by springback analysis of an analysis model of the same shape as the press-formed product. As illustrated in FIG. 1, the springback-amount-discrepancy-causing-portion specifying method according to Embodiment 1 includes a formed-product-driving-stress-distribution acquisition step S1, an analysis-driving-stress-distribution acquisition step S3, a formed-product-springback-amount acquisition step S5, a stress-substitution-region selection step S7, a stress-substituted-springback-amount acquisition step S9, and a springback-amount-discrepancy-causing-portion specifying step S11.

In the following description, a "bottom dead center" refers to a state in which a punch and a die make contact with each other with a blank interposed therebetween (a state in which forming has been completed in CAE analysis).

A "forming bottom dead center" refers to a state in which forming has been completed in an actual press forming die.

An "analysis bottom dead center" refers to a state in which forming has been completed in CAE analysis.

Figure 2:
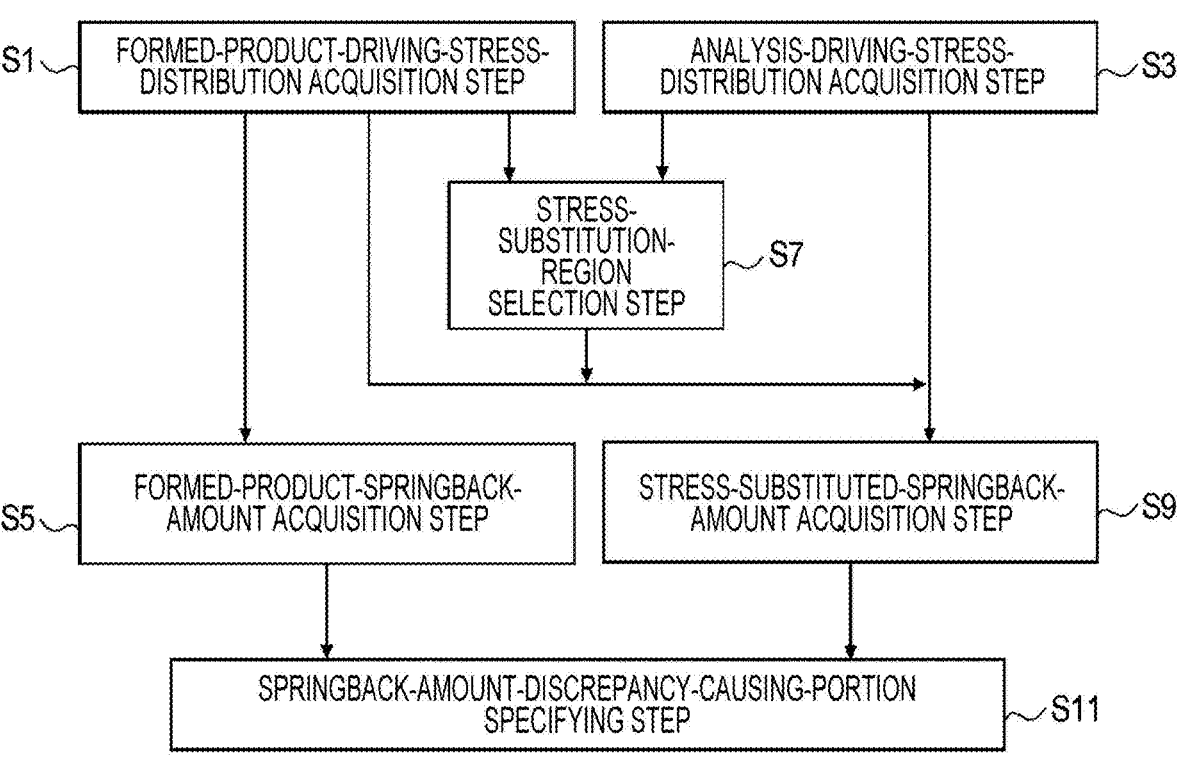
FIG. 2 is an illustration of a press-formed product according to Embodiment 1.

The steps described above will be described by taking, as an example, a case where a press-formed product 10 having a hat cross-sectional shape as illustrated in FIG. 2 is press-formed.

In CAE analysis according to the present embodiment, press forming analysis is conducted in which a blank model 9, which is a material to be processed (steel sheet), is held by a forming die model 3 made up of a die 5 and a punch 7, as illustrated in FIG. 2. In the press forming analysis, the blank model 9 is fixed by a positioning pin in a forming process, as illustrated in FIG. 2. An element size of the blank model 9 is set to approximately 1 mm, and as analysis conditions, a coefficient of friction between the blank model 9 and the forming die model 3 is set to 0.15 and a forming bottom dead center position is set to such a position that a gap between upper and lower forming die models becomes 1.45 mm. Furthermore, a 980 MPa grade GA steel sheet having a sheet thickness of 1.4 mm is used as the material to be processed.

It is assumed that the actual panel according to the present embodiment is press-formed under the same conditions as the forming conditions set in the CAE analysis.

<Formed-Product-Driving-Stress-Distribution Acquisition Step>

The formed-product-driving-stress-distribution acquisition step S1 is a step of acquiring a driving stress distribution of an actual panel.

Specifically, an actual panel is press-formed under the same conditions as the forming conditions set in the CAE analysis, and a press-formed product model is created from three-dimensional shape measurement data acquired by measuring a surface shape of the actual panel after release from a die. Then, a stress distribution such as the one illustrated in FIG. 4(*a*) is acquired by conducting mechanical analysis in a state where the press-formed product model is held by the forming die model 3 illustrated in FIG. 2 to the forming bottom dead center.

Elastic finite element analysis is conducted as the mechanical analysis, and a stress distribution obtained by the elastic finite element analysis corresponds to stress that contributes to springback of the actual panel, that is, driving stress of the actual panel.

As a specific method of measurement of a three-dimensional shape of the actual panel, creation of the press-formed product model, and the elastic finite element analysis, the method described in Patent Literature 3 can be used, for example.

<Analysis-Driving-Stress-Distribution Acquisition Step>

The analysis-driving-stress-distribution acquisition step S3 is a step of acquiring a bottom dead center stress distribution and a residual stress distribution after release from a die in the CAE analysis (springback analysis) and acquiring driving stress in the CAE analysis from a difference therebetween.

Although stress of a press-formed product at a bottom dead center influences behavior of springback, stress remains even in the press-formed product that has been released from a forming die. That is, it is conceivable that not all stress before the release from the die contributes to springback, and the stress remaining in the press-formed product in which springback occurred after the release from the die has not contributed to the springback.

It is necessary to calculate driving stress in the CAE analysis in order to conduct accurate comparison analysis with the driving stress (stress that has contributed to the springback) acquired in the formed-product-driving-stress-distribution acquisition step S1.

Figure 3:
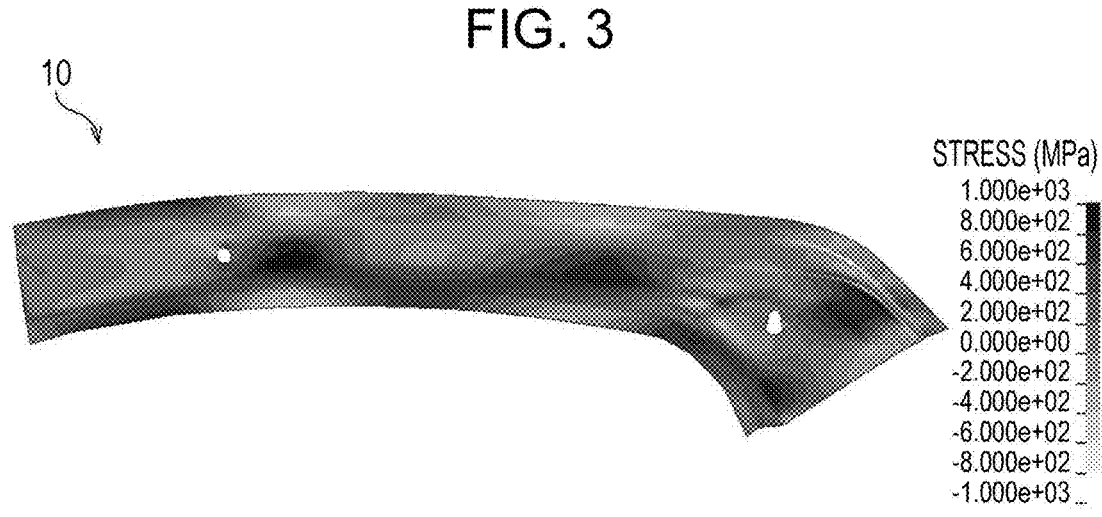
FIG. 3 illustrates a driving stress distribution in CAE analysis in Embodiment 1.

In view of this, in the analysis-driving-stress-distribution acquisition step S3, stress of the press-formed product before release from a die (bottom dead center) and residual stress of the press-formed product after the release from the die (after springback) are acquired by conducting CAE analysis by using the forming die model 3 and the blank model 9 illustrated in FIG. 2, and a driving stress distribution (hereinafter also simply referred to as a stress distribution) in the CAE analysis such as the one illustrated in FIG. 3 is calculated by subtracting the residual stress after the release from the die from the stress at the bottom dead center.

Note that in the analysis-driving-stress-distribution acquisition step S3, the CAE analysis is conducted by a computer, and for example, finite element method analysis software can be used for the CAE analysis. In the present embodiment, the analysis is conducted by executing LS-DYNA Ver.971, which is commercially available finite element method analysis software, on a computer, and a dynamic explicit method is applied to a solver.

Furthermore, the disclosed embodiments are not limited to one using the forming die model 3 illustrated in FIG. 2 or one using the press-formed product 10 having a hat cross-sectional shape as a target to be formed, and a forming die model, a press-formed product, and the like can be set as appropriate in accordance with a target to be formed.

Furthermore, in a case where the residual stress after the release from the die is a small value that can be almost ignored, the stress distribution at the bottom dead center may be used as the analysis driving stress distribution while regarding that all of the stress distribution at the analysis bottom dead center contributes to springback.

<Formed-Product-Springback-Amount Acquisition Step>

The formed-product-springback-amount acquisition step S5 is a step of setting the formed product driving stress distribution acquired in the formed-product-driving-stress-distribution acquisition step S1 in the formed product shape at the bottom dead center in the CAE analysis and calculating a springback amount by conducting springback analysis based on the formed product driving stress distribution thus set.

Figure 4:
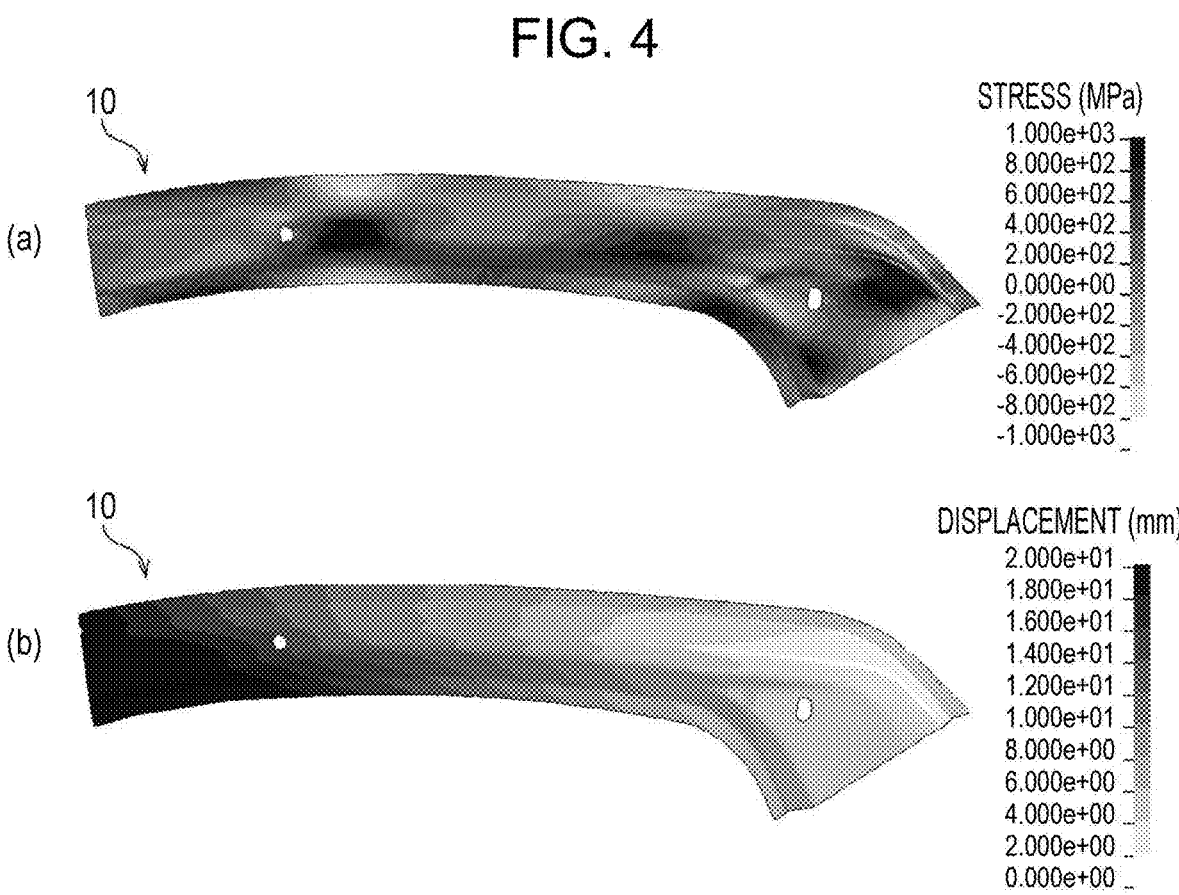
FIG. 4 illustrates (a) a driving stress distribution of an actual panel and (b) displacement calculated by springback analysis based on the driving stress distribution in Embodiment 1.
Figure 5:
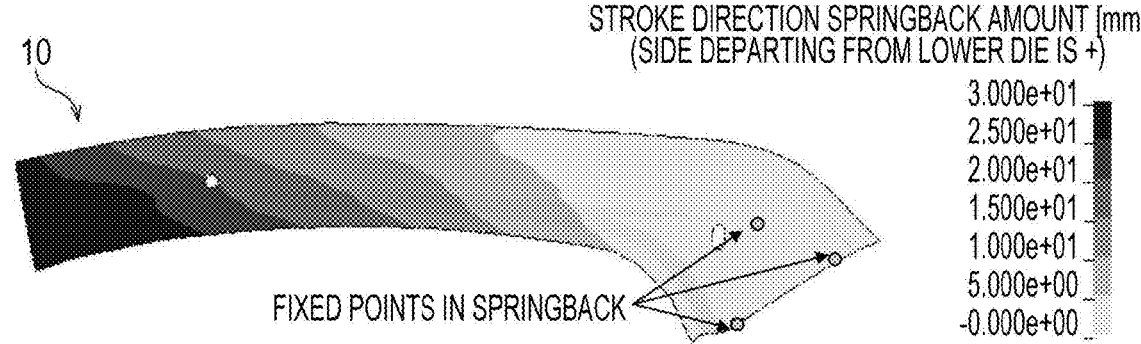
FIG. 5 illustrates fixed points in springback analysis and an analysis result of displacement obtained by the springback analysis in Embodiment 1.

In the present embodiment, springback analysis is conducted on the press-formed product 10 (FIG. 4(*a*)) of a bottom dead center shape in which the formed product driving stress distribution has been set, and displacement (FIG. 4(*b*)) after springback is calculated by the springback analysis. In the springback analysis, displacement caused by springback is calculated while fixing three positions at one end of the press-formed product at fixed points, as illustrated in FIG. 5.

Figure 6:
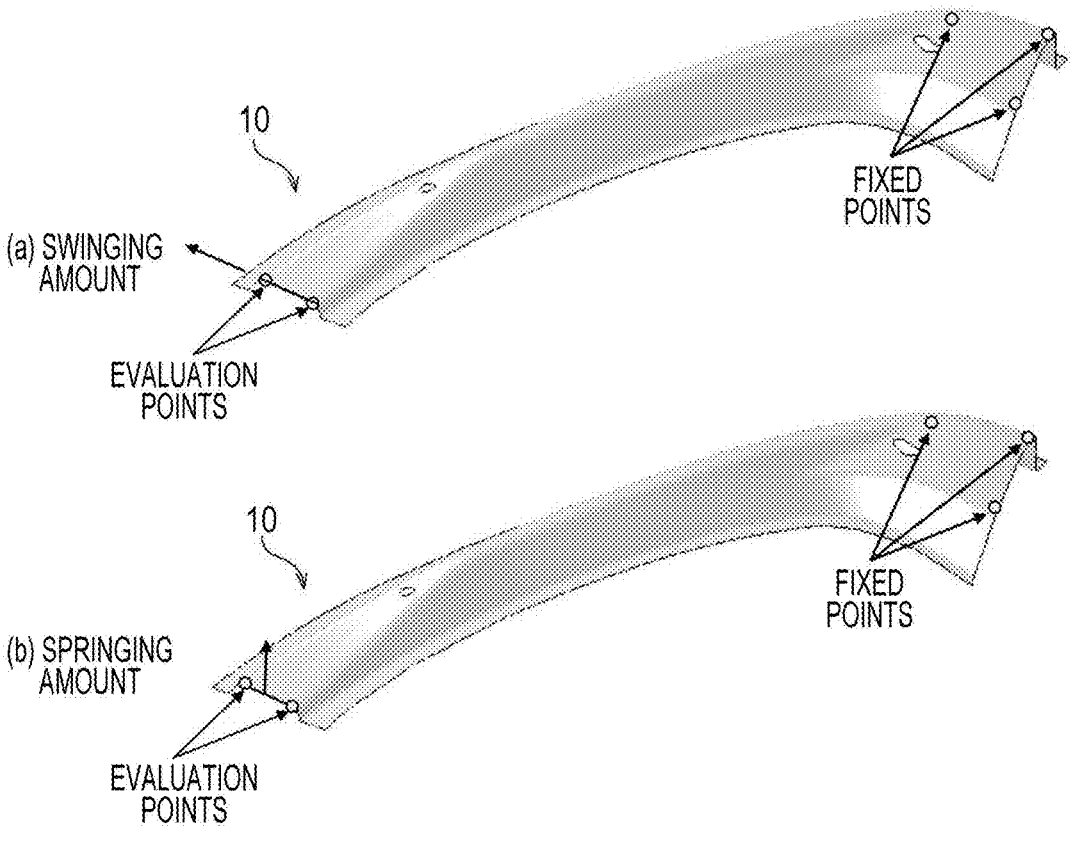
FIG. 6 is an illustration describing a method for calculating a swinging amount and a springing amount, which are springback amounts, according to Embodiment 1.

Next, a swinging amount (FIG. 6(*a*)) and a springing amount (FIG. 6(*b*)) are calculated based on the displacement calculated by the springback analysis, as illustrated in FIG. 6. In the present embodiment, the swinging amount is an amount of movement in a direction indicated by the arrow (the direction of the arrow is positive) in FIG. 6(*a*) caused by springback at any of two evaluation points at the other end of the press-formed product 10 as illustrated in FIG. 6(*a*), and the springing amount is an amount of displacement in a forming stroke direction (a direction away from the die 5 is positive) at a midpoint between the two evaluation points as illustrated in FIG. 6(*b*).

<Stress-Substitution-Region Selection Step>

Figures 7, 8:
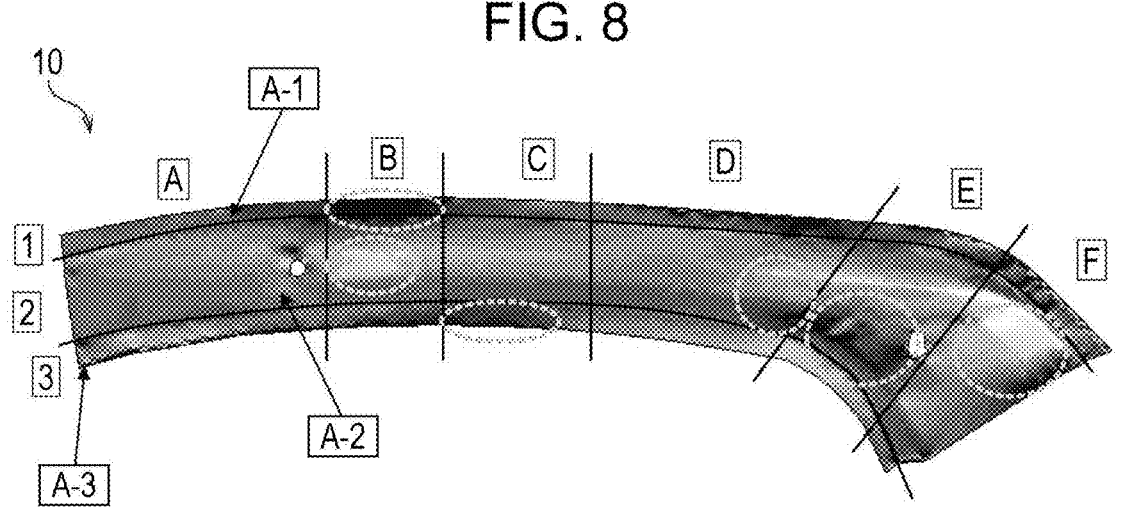
FIG. 7 illustrates (a) a driving stress distribution in CAE analysis, (b) a driving stress distribution of an actual panel, and (c) a stress difference distribution between the CAE analysis and the actual panel in Embodiment 1.
FIG. 8 is an illustration describing division of a stress difference distribution into regions and regions where a stress difference is relatively large in Embodiment 1.

As illustrated in FIG. 7, the stress-substitution-region selection step S7 is a step of calculating, as a stress difference distribution (FIG. 7(*c*)), a difference between the stress distribution (FIG. 3, FIG. 7(a)) acquired in the analysis-driving-stress-distribution acquisition step S3 and the stress distribution (FIG. 4(a), FIG. 7(a)) acquired in the formed-product-driving-stress-distribution acquisition step S1 and selects a region where a stress difference is relatively large as a region in which stress substitution is to be performed (a region according to the disclosed embodiments) (hereinafter also referred to as a "stress substitution region") on the basis of the calculated stress difference distribution.

A reason why a region where a stress difference is relatively large is selected as a stress substitution region is, as has been described herein, based on the finding that a difference in driving stress distribution between CAE analysis and an actual panel is a cause of a discrepancy in springback amount. That is, a region where a stress difference is relatively large, in other words, a region where a difference in driving stress distribution is relatively large is considered to include a portion that causes a discrepancy.

In each of the stress distributions illustrated in FIG. 7, a difference in stress is indicated by a color density. In FIG. 7(c), a range of color display is set smaller than that in FIG. 7(a) and FIG. 7(b). This makes it easier to distinguish a portion where a stress difference is large (a portion close to black or white) and a portion where a stress difference is small (a portion close to a gray scale intermediate color on the right side of FIG. 7(c)).

In the present embodiment, it is assumed that the press-formed product 10 is divided into a plurality of regions (into six regions (A to F) in a longitudinal direction and three regions (1 to 3) in a width direction), stress differences in the respective regions are compared, and a region determined as being relatively large in stress difference (a region including a portion close to black or white) is selected, as illustrated in FIG. 8.

In the stress-substitution-region selection step S7 according to the present embodiment, six regions (B-1, B-2, C-3, D-2, E-2, and F-2) indicated by the broken-line circles in FIG. 8 are selected.

Note that a method for selecting a region where a stress difference is relatively large as a stress substitution region is not limited to the above method, and for example, in a case where the method is performed by a computer or the like, a stress difference in each of the regions may be converted into a numerical value, and a predetermined number of regions such as ½ or ⅓ of all of the divided regions may be selected in descending order of the numerical value. Although a region determined as being relatively large in stress difference is selected in the present embodiment, a selection criterion is not limited to this, and for example, all regions having a stress difference equal to or larger than a preset value may be selected.

<Stress-Substituted-Springback-Amount Acquisition Step>

The stress-substituted-springback-amount acquisition step S9 is a step of setting the analysis driving stress distribution acquired in the analysis-driving-stress-distribution acquisition step S3 as a formed product shape at the bottom dead center, substituting a value of analysis driving stress in the region selected in the stress-substitution-region selection step S7 in the analysis driving stress distribution thus set with a value of formed product driving stress in a region corresponding to the selected region in the formed-product driving stress distribution acquired in the formed-product-driving-stress-distribution acquisition step S1, and acquiring a springback amount by conducting springback analysis based on a stress distribution obtained after the substitution (stress substituted distribution).

Figures 9, 10:
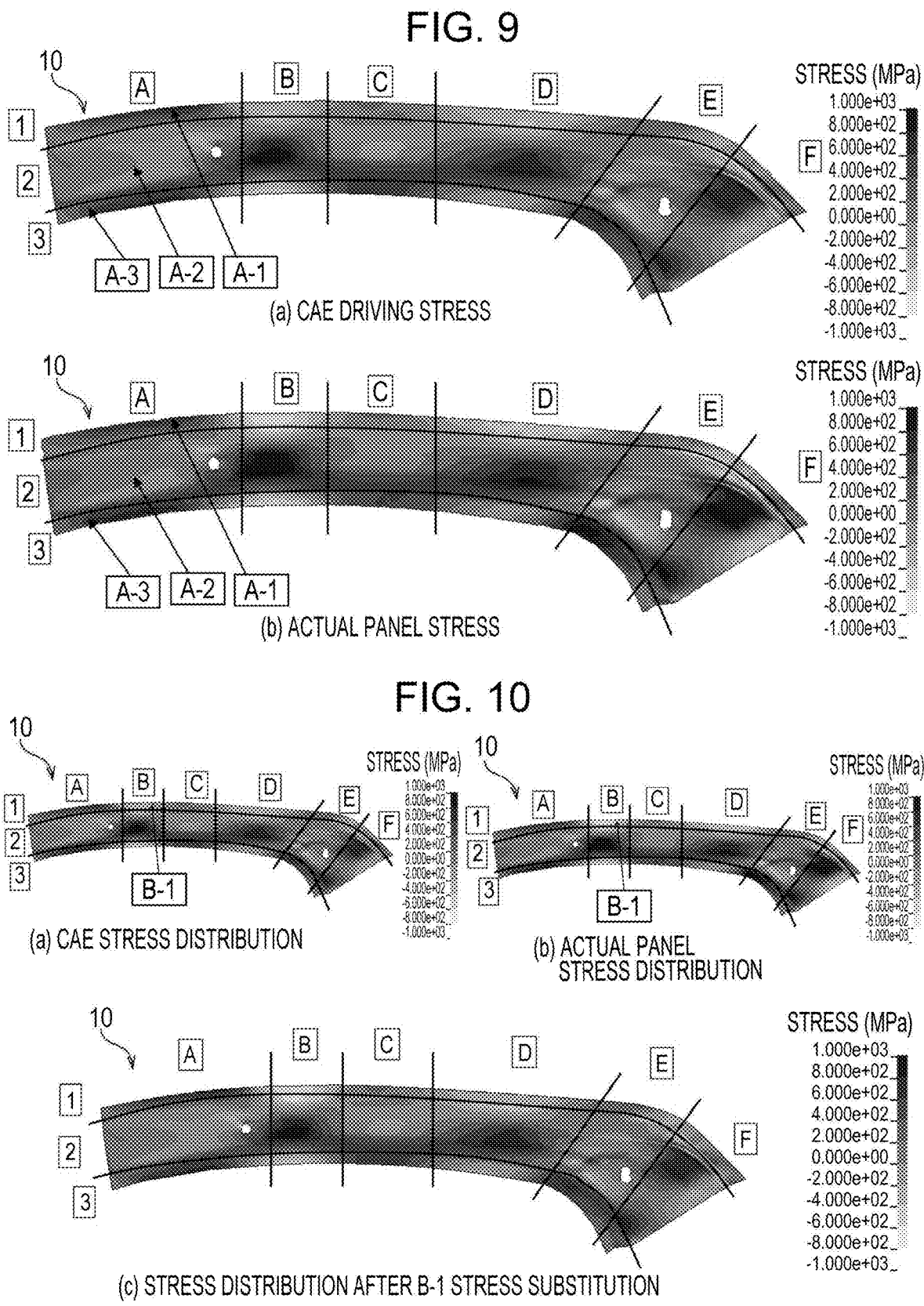
FIG. 9 is an illustration describing (a) division of a driving stress distribution in the CAE analysis into regions and (b) division of a driving stress distribution in the actual panel into regions in Embodiment 1.
FIG. 10 illustrates (a), (b) a region in which driving stress is to be substituted and (c) a stress distribution (stress substituted distribution) obtained after substitution of driving stress in the region in Embodiment 1 (region B-1).

FIG. 9 illustrates a state where the driving stress distribution in the CAE analysis and the driving stress distribution of the actual panel have been divided into regions in the same manner as the stress difference distribution in FIG. 8. First, stress substitution is performed in the region B-1, which is one of the regions selected in the stress-substitution-region selection step S7, by using the driving stress distribution in the CAE analysis and the driving stress distribution of the actual panel. FIG. 10(c) illustrates a result obtained by substituting stress in the region B-1 in the driving stress distribution in the CAE analysis (FIG. 10(a)) with stress in the region B-1 in the driving stress distribution of the actual panel (FIG. 10(b)).

Figure 11:
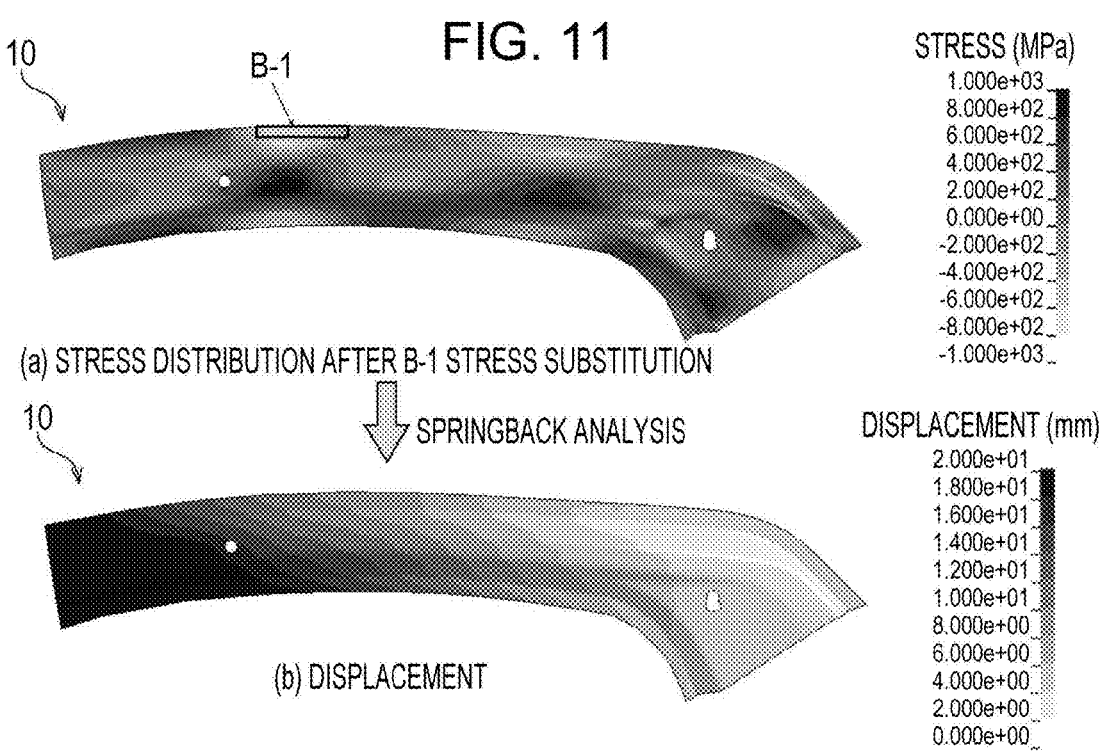
FIG. 11 illustrates (a) a stress substituted distribution and (b) displacement calculated by springback analysis based on the stress substituted distribution in Embodiment 1 (region B-1).
Figure 12:
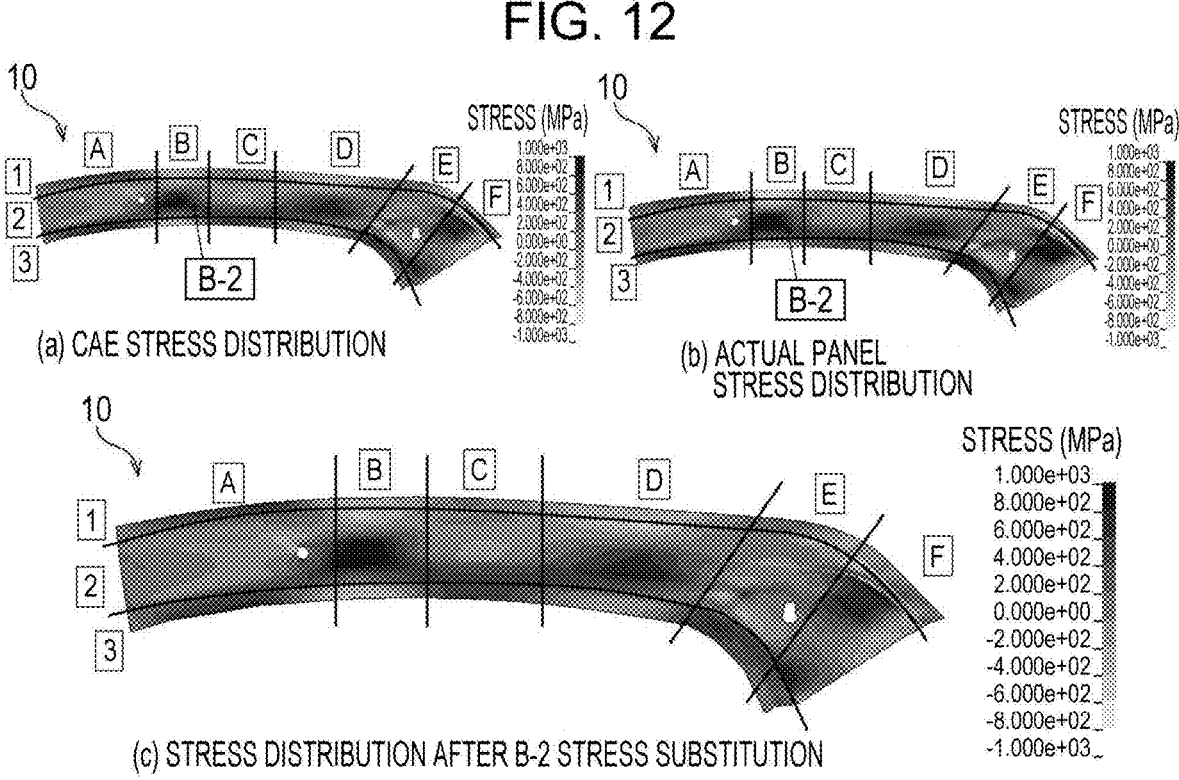
FIG. 12 illustrates (a), (b) a region in which driving stress is to be substituted and (c) a stress distribution (stress substituted distribution) obtained after substitution of driving stress in the region in Embodiment 1 (region B-2).
Figure 17:
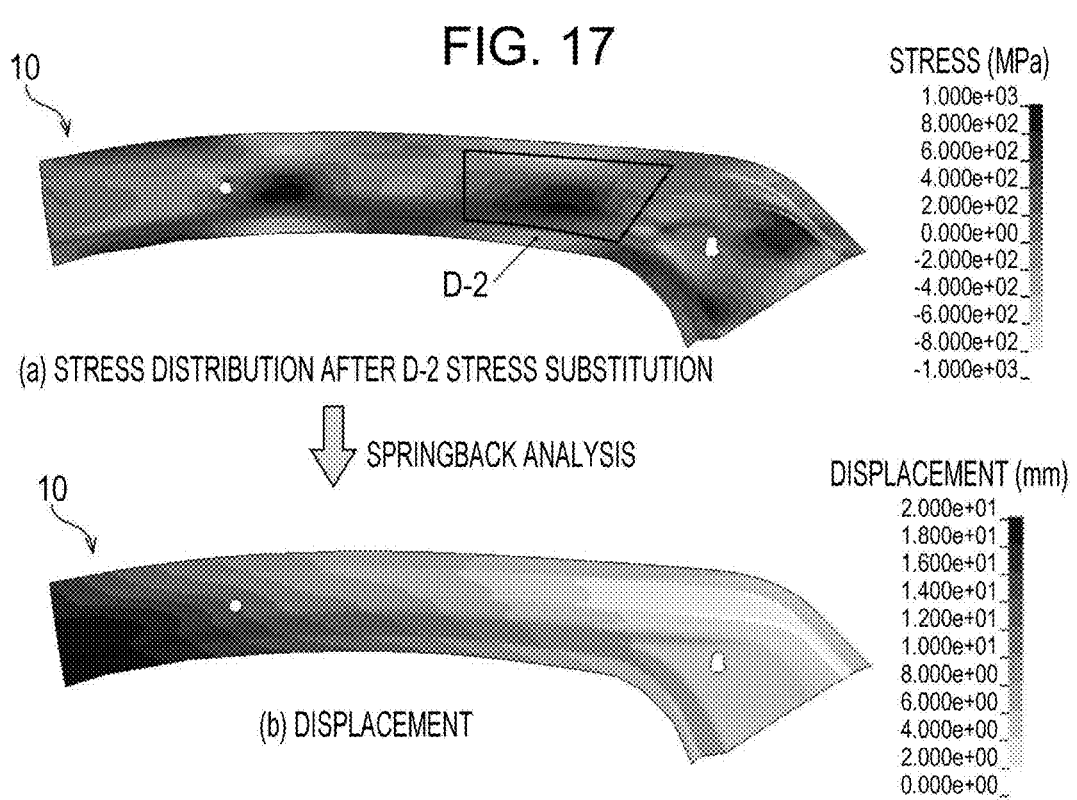
FIG. 17 illustrates (a) a stress substituted distribution and (b) displacement calculated by springback analysis based on the stress substituted distribution in Embodiment 1 (region D-2).
Figure 18:
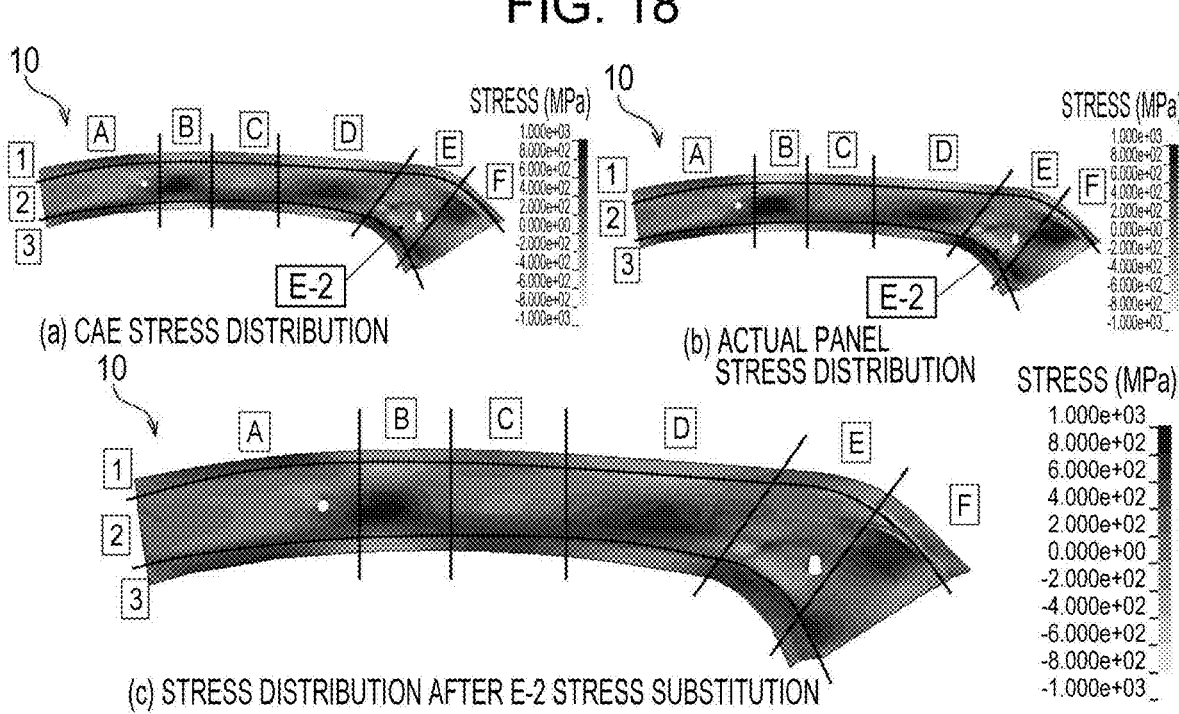
FIG. 18 illustrates (a), (b) a region in which driving stress is to be substituted and (c) a stress distribution (stress substituted distribution) obtained after substitution of driving stress in the region in Embodiment 1 (region E-2).

Furthermore, FIG. 11 illustrates a result of displacement calculated by conducting springback analysis based on the stress distribution obtained after the stress substitution in the region B-1. A swinging amount (FIG. 6(a)) and a springing amount (FIG. 6(b)), which are springback amounts, are calculated based on the calculated displacement.

FIGS. 12 to 23 illustrate results of springback analysis based on stress substituted distributions obtained by performing stress substitution in the other regions selected in the stress-substitution-region selection step S7 in a similar manner. A swinging amount and a springing amount are calculated, based on calculated displacement, also for the other regions.

In the region D-2 and the region E-2, a portion having a large stress difference that straddles the two regions is observed (see FIG. 8), and therefore not only a springback amount obtained in a case where stress substitution is performed in each of the regions, but also a springback amount obtained in a case where stress substitution is performed in both of the two regions are calculated (see FIGS. 20 and 21). That is, stress substitution need not necessarily be performed in a single region, and stress in a plurality of regions may be substituted.

<Springback-Amount-Discrepancy-Causing-Portion Specifying Step>

The springback-amount-discrepancy-causing-portion specifying step S11 is a step of finding a difference between the springback amount acquired in the stress-substituted-springback-amount acquisition step S9 and the springback amount acquired in the formed-product-springback-amount acquisition step S5 and specifying, based on the difference thus found, a portion that causes a discrepancy in springback amount between the CAE analysis and the actual panel.

Figures 23, 24:
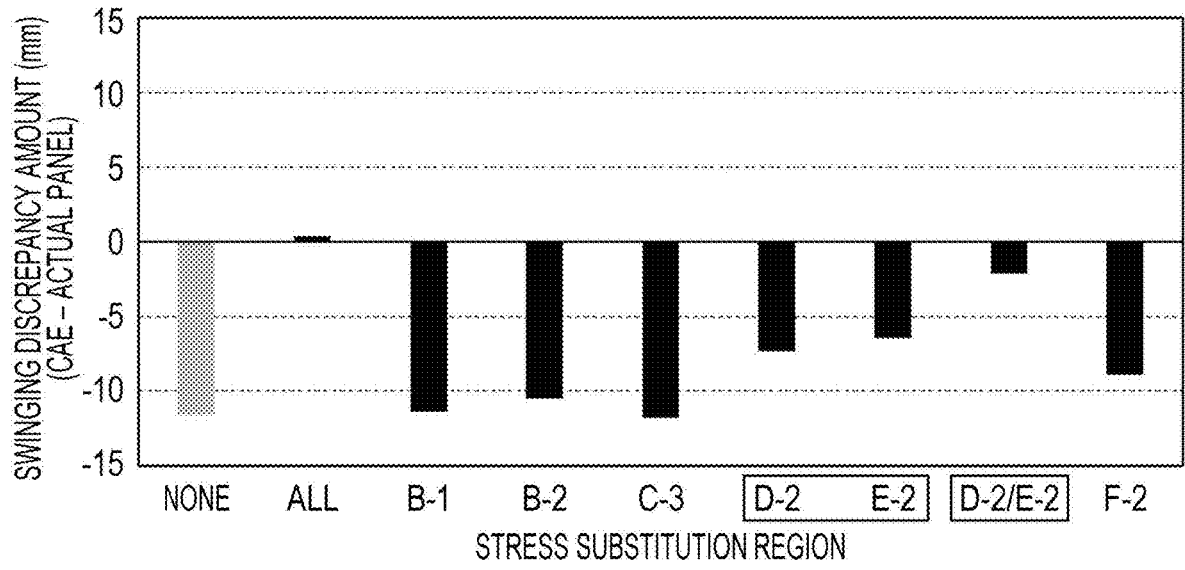
FIG. 23 illustrates (a) a stress substituted distribution and (b) displacement calculated by springback analysis based on the stress substituted distribution in Embodiment 1 (region F-2).
FIG. 24 is a graph illustrating a relationship between regions in which driving stress has been substituted and swinging discrepancy amounts occurring due to springback after substitution of the driving stress.

FIG. 24 illustrates a result of calculation of a swinging discrepancy amount, which is a difference between the swinging amount (swinging amount in the CAE analysis) acquired in the stress-substituted-springback-amount acquisition step S9 and a swinging amount of the actual panel acquired in the formed-product-springback-amount acquisition step S5.

"NONE" on the horizontal axis of the graph represents a case where stress substitution is not performed. In this case, a discrepancy amount is −11.6 mm, which is a difference between the CAE analysis and the actual panel. "ALL" represents a case where all regions of the driving stress distribution in the CAE analysis have been substituted with the driving stress distribution of the actual panel. In this case, the discrepancy amount is almost zero.

"B-1" to "F-2" on the horizontal axis represent swinging discrepancy amounts obtained in a case where stress substitution of the driving stress in the CAE analysis has been performed for the six regions selected in the stress-substitution-region selection step S7.

As is clear from FIG. 24, in a case where stress substitution is performed in "D-2" or "E-2" among the selected six regions, the swinging discrepancy amount decreases relative to the discrepancy amount occurring between the CAE analysis and the actual panel indicated by "NONE".

Furthermore, as is clear from "D-2/E-2", the swinging discrepancy amount further decreases by substitution with the driving stress distribution of the actual panel in both of the regions D-2 and E-2.

Therefore, from the result in FIG. 24, the regions D-2 and E-2 can be specified as portions causing a discrepancy in swinging amount between the CAE analysis and the actual panel.

Figure 25:
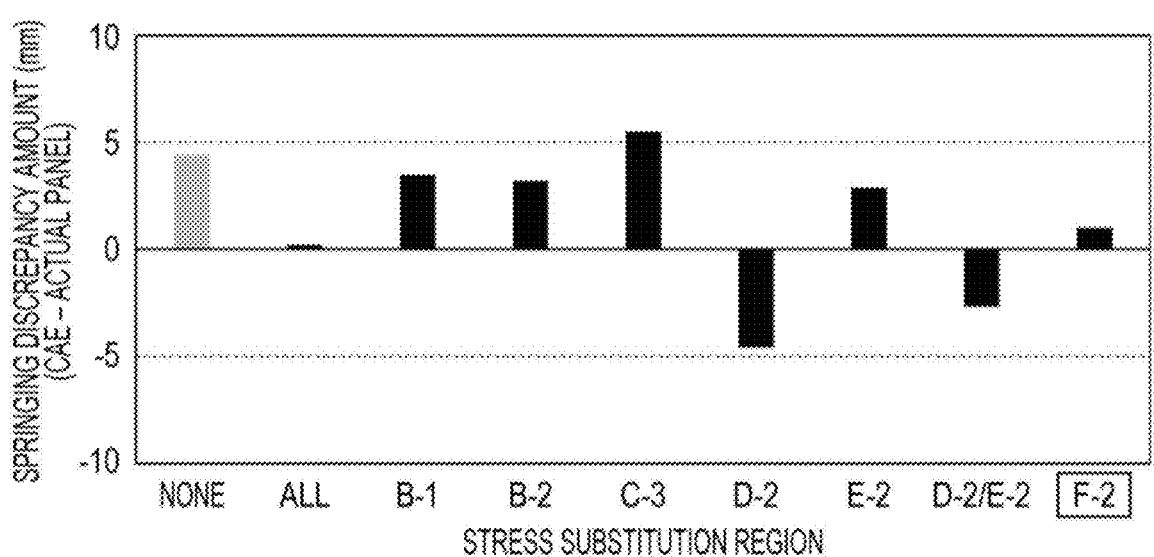
FIG. 25 is a graph illustrating a relationship between regions in which driving stress has been substituted and springing discrepancy amounts occurring due to springback after substitution of the driving stress.

Similarly, FIG. 25 illustrates a result of calculation of springing discrepancy amounts between the CAE analysis and the actual panel. As is clear from FIG. 25, in a case where stress substitution is performed in "F-2" among the selected six regions, the springing discrepancy amount decreases relative to a discrepancy amount occurring between the CAE analysis and the actual panel indicated by "NONE".

Therefore, from the result in FIG. 25, the region F-2 can be specified as a portion causing a discrepancy in springing amount between the CAE analysis and the actual panel.

Meanwhile, the results show that regions that have substantially the same degree of discrepancy amount as "NONE" even after stress substitution are portions that have small influence on a discrepancy occurring between the CAE analysis and the actual panel.

This suggests that even if such regions are specified as being portions causing a discrepancy and press forming is performed after taking some sort of countermeasures for such regions, almost no change occurs in springback discrepancy amount between the CAE analysis and the actual panel. Accordingly, in the disclosed embodiments, in a case where a springback discrepancy amount obtained by substitution of driving stress in a region is substantially the same degree as a springback discrepancy amount between the CAE analysis and the actual panel obtained in a case where stress substitution is not performed, this region is not a portion causing a springback amount discrepancy between the CAE analysis and the actual panel.

As described above, according to the method according to the present embodiment, a portion causing a springback amount discrepancy between the CAE analysis and the actual panel can be specified with high accuracy.

By thus specifying a portion causing a springback amount discrepancy, work for adjusting a forming die, forming conditions, and the like in order to make shapes of the CAE analysis and the actual panel after release from the die close to each other can be efficiently performed.

Furthermore, by revising settings of the CAE analysis and a forming die shape mainly for the specified portion, it is possible to improve reproducibility of springback analysis and assure usefulness of a countermeasure against springback using CAE analysis.

Although a method for dividing a press-formed product into 18 regions has been described in the present embodiment, a press-formed product having a complicated shape needs to be divided into a larger number of regions, and therefore it takes time to calculate a result for all of the regions. Narrowing regions assumed to have large influence by using the stress-substitution-region selection step S7 according to the present embodiment is effective in shortening a time it takes to specify a portion causing a discrepancy.

Note, however, that the disclosed embodiments are not limited to this, and the stress-substituted-springback-amount acquisition step S9 may be performed while regarding all of the divided regions as regions in which stress substitution is to be performed without performing the stress-substitution-region selection step S7.

Embodiment 2

The springback-amount-discrepancy-causing-portion specifying method described in Embodiment 1 can be realized by execution of a preset program by a personal computer (PC). An example of such a device is described in the present embodiment.

Figure 26:
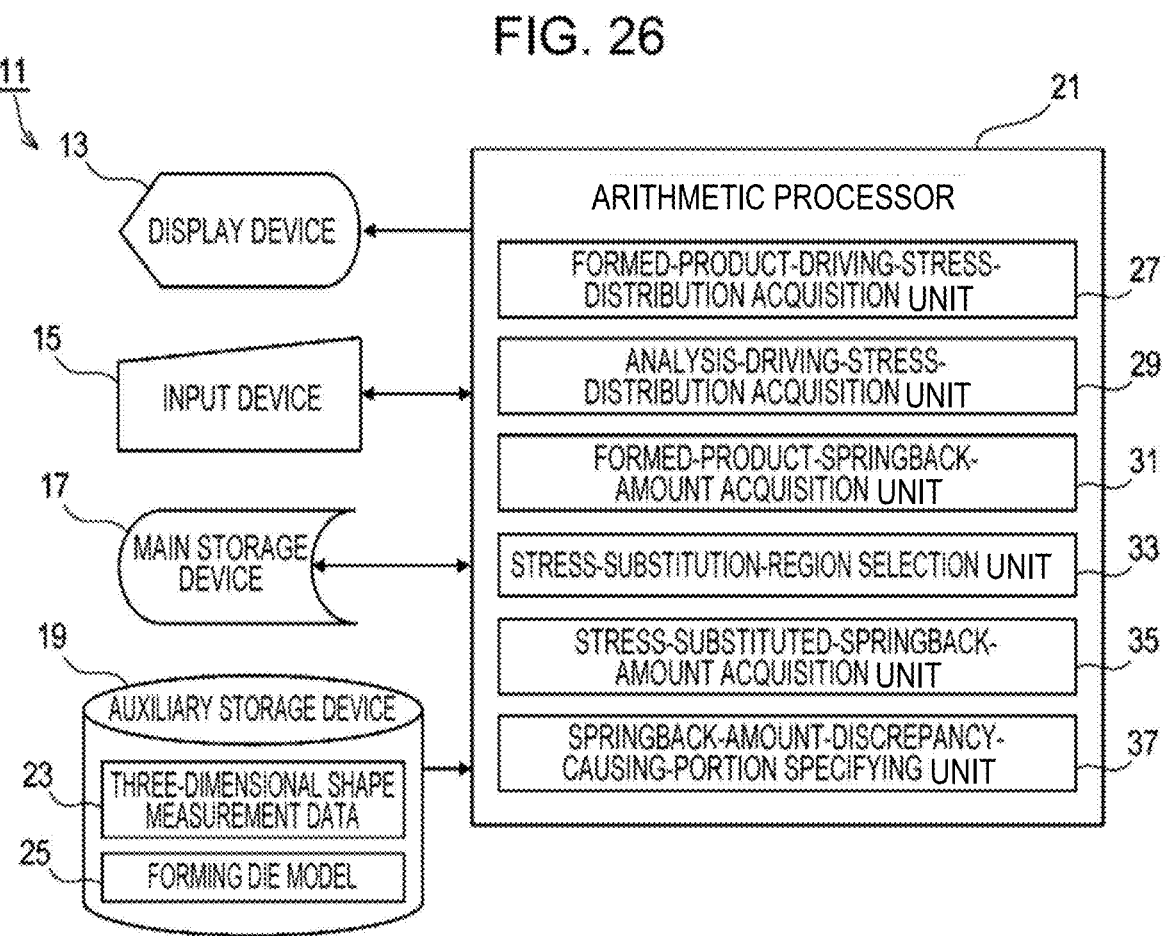
FIG. 26 is a block diagram describing a configuration of a springback-amount-discrepancy-causing-portion specifying device according to Embodiment 2.

As illustrated in FIG. 26, a springback-amount-discrepancy-causing-portion specifying device 11 according to the present embodiment has a display device 13, an input device 15, a main storage device 17, an auxiliary storage device 19, and an arithmetic processor 21. The display device 13, the input device 15, the main storage device 17, and the auxiliary storage device 19 are connected to the arithmetic processor 21 and perform functions upon receipt of commands from the arithmetic processor 21.

The display device 13 is, for example, used to display an execution result and is, for example, a liquid crystal monitor. The input device 15 is, for example, used to receive entry from an operator and is, for example, a keyboard and a mouse. The main storage device 17 is, for example, used for temporary storage and computation of data used in the arithmetic processor 21 and is, for example, a RAM. The auxiliary storage device 19 is, for example, used to store data and is, for example, a hard disk.

The auxiliary storage device 19 stores therein at least three-dimensional shape measurement data 23 and various kinds of data necessary for CAE analysis such as the forming die model 25.

The arithmetic processor 21 is, for example, a CPU of a PC or the like. Formed-product-driving-stress-distribution acquisition unit 27, analysis-driving-stress-distribution acquisition unit 29, formed-product-springback-amount acquisition unit 31, stress-substitution-region selection unit 33, stress-substituted-springback-amount acquisition unit 35, and springback-amount-discrepancy-causing-portion specifying unit 37 are realized by execution of preset programs by the arithmetic processor 21.

The formed-product-driving-stress-distribution acquisition unit 27 realizes processing similar to the formed-product-driving-stress-distribution acquisition step S1 described in Embodiment 1. Similarly, the analysis-driving-stress-distribution acquisition unit 29 realizes the analysis-driving-stress-distribution acquisition step S3, the formed-product-springback-amount acquisition unit 31 realizes the formed-product-springback-amount acquisition step S5, the stress-substitution-region selection unit 33 realizes the stress-substitution-region selection step S7, the stress-substituted-springback-amount acquisition unit 35 realizes the stress-substituted-springback-amount acquisition step S9, and the springback-amount-discrepancy-causing-portion specifying unit 37 realizes the springback-amount-discrepancy-causing-portion specifying step S11.

According to the embodiment described above, it is possible to specify a portion causing a springback amount discrepancy between CAE analysis and an actual panel with high accuracy as in Embodiment 1.

Therefore, various adjusting work for making shapes of the CAE analysis and the actual panel after release from a die close to each other can be performed efficiently based on the specified portion, and usefulness of a countermeasure against springback can be assured.

Although an example in which the springback-amount-discrepancy-causing-portion specifying device 11 according to the present embodiment has the stress-substitution-region selection unit 33 has been described, the disclosed embodiments are not limited to this, and the stress-substituted-springback-amount acquisition unit 35 may perform stress substitution while regarding all of the divided regions as regions in which stress substitution is to be performed without providing the stress-substitution-region selection unit 33, as in Embodiment 1.

The disclosed embodiments are not only applicable to a final formed product (product shape) but also applicable to an incomplete formed product in a case where a press-formed product is formed in plural forming steps. Although an example in which a material to be processed is a steel sheet has been described in the above embodiments, the disclosed embodiments are also applicable to an aluminum sheet.

The invention claimed is:

1. A method for specifying a portion of a formed product shape that causes a first difference between a first springback amount occurring in a press-formed product obtained by press-forming an actual panel and a second springback amount obtained by conducting springback analysis on an analysis model of a same shape as the press-formed product, the method comprising:

creating a press-formed product model from three-dimensional shape measurement data acquired by measuring a surface shape of the analysis model of the same shape as the press-formed product after release of the analysis model of the same shape as the press-formed product from a die and conducting mechanical analysis in a state where the press-formed product model is held by a forming die model to a bottom dead center to acquire a stress distribution at a forming bottom dead center as a formed product driving stress distribution that contributes to springback of the analysis model of the same shape as the press-formed product;

acquiring a bottom dead center stress distribution and a remaining stress distribution after the release of the analysis model of the same shape as the press-formed product from the die in the springback analysis and acquiring a second difference between the bottom dead center stress distribution and the remaining stress distribution after the release of the analysis model of the same shape as the press-formed product from the die as an analysis driving stress distribution in the springback analysis;

setting the formed product driving stress distribution in the formed product shape at the bottom dead center in the springback analysis and acquiring a formed-product springback amount by performing springback analysis based on the formed product driving stress distribution set;

setting the analysis driving stress distribution in the formed product shape at the bottom dead center, substituting a value of analysis driving stress in a region of the analysis driving stress distribution set with a value of formed product driving stress in a region of the formed product driving stress distribution corresponding to the region, and acquiring a stress-substituted springback amount by conducting springback analysis based on a stress substituted distribution obtained by the substitution; and finding a third difference between the stress-substituted springback amount and the formed-product springback amount and specifying, based on the third difference found, the portion of the formed product shape that causes the first difference, wherein the die is adjusted based on the specified portion of the formed product shape that causes the first difference.

2. The method according to claim 1, further comprising acquiring a stress difference distribution from a fourth difference between the analysis driving stress distribution and the formed product driving stress distribution and selecting, from the stress difference distribution, a region having a larger stress difference than a second region as the region in which stress substitution is to be performed.

3. A device for specifying a portion of a formed product shape that causes a first difference between a first springback amount occurring in a press-formed product obtained by press-forming an actual panel and a second springback amount obtained by conducting springback analysis on an analysis model of a same shape as the press-formed product, the device comprising:

a processor programmed to:

create a press-formed product model from three-dimensional shape measurement data acquired by measuring a surface shape of the analysis model of the same shape as the press-formed product after release of the analysis model of the same shape as the press-formed product from a die and conduct mechanical analysis in a state where the press-formed product model is held by a forming die model to a bottom dead center to acquire a stress distribution at a forming bottom dead center as a formed product driving stress distribution that contributes to springback of the analysis model of the same shape as the press-formed product;

acquire a bottom dead center stress distribution and a remaining stress distribution after the release of the analysis model of the same shape as the press-formed product from the die in the springback analysis and acquire a second difference between the bottom dead center stress distribution and the remaining stress distribution after the release of the analysis model of the same shape as the press-formed product from the die as an analysis driving stress distribution in the springback analysis;

set the formed product driving stress distribution in the formed product shape at the bottom dead center in the springback analysis and acquire a formed-product springback amount by performing springback analysis based on the formed product driving stress distribution set;

set the analysis driving stress distribution in the formed product shape at the bottom dead center, substitute a value of analysis driving stress in a region of the analysis driving stress distribution set with a value of formed product driving stress in a region of the formed product driving stress distribution corresponding to the region, and acquire a stress-substituted springback amount by conducting springback analysis based on a stress substituted distribution obtained by the substitution; and find a third difference between the stress-substituted springback amount and the formed-product springback amount and specify, based on the third difference found, the portion of the formed product shape that causes the first difference in springback amount between the press-formed product and the spring-back analysis, wherein the die is adjusted based on the specified portion of the formed product shape that causes the first difference.

4. The device according to claim 3, wherein the processor is further programmed to acquire a stress difference distribution from a fourth difference between the analysis driving stress distribution and the formed product driving stress distribution and select, from the stress difference distribution, a region having a larger stress difference than a second region as the region in which stress substitution is to be performed.

5. A non-transitory computer readable medium storing a program for specifying a portion of a formed product shape that causes a first difference between a first springback amount occurring in a press-formed product obtained by press-forming an actual panel and a second springback amount obtained by conducting springback analysis on an analysis model of a same shape as the press-formed product, the program causing a processor to execute:

creating a press-formed product model from three-dimensional shape measurement data acquired by measuring a surface shape of the analysis model of the same shape as the press-formed product after release of the analysis model of the same shape as the press-formed product from a die and conducting mechanical analysis in a state where the press-formed product model is held by a forming die model to a bottom dead center to acquire a stress distribution at a forming bottom dead center as a formed product driving stress distribution that contributes to springback of the analysis model of the same shape as the press-formed product;

acquiring a bottom dead center stress distribution and a remaining stress distribution after the release of the analysis model of the same shape as the press-formed product from the die in the springback analysis and acquiring a second difference between the bottom dead center stress distribution and the remaining stress distribution after the release of the analysis model of the same shape as the press-formed product from the die as an analysis driving stress distribution in the springback analysis;

setting the formed product driving stress distribution in the formed product shape at the bottom dead center in the springback analysis and acquiring a formed-product springback amount by performing springback analysis based on the formed product driving stress distribution set;

setting the analysis driving stress distribution in the formed product shape at the bottom dead center, substituting a value of analysis driving stress in a region of the analysis driving stress distribution set with a value of formed product driving stress in a region of the formed product driving stress distribution corresponding to the region, and acquiring a stress-substituted springback amount by conducting springback analysis based on a stress substituted distribution obtained by the substitution; and finding a third difference between the stress-substituted springback amount and the formed-product springback amount and specifying, based on the third difference found, the portion of the formed product shape that causes the first difference, wherein the die is adjusted based on the specified portion of the formed product shape that causes the first difference.

6. The non-transitory computer readable medium according to claim 5, wherein the program causes the processor to further execute acquiring a stress difference distribution from a fourth difference between the analysis driving stress distribution and the formed product driving stress distribution and selecting, from the stress difference distribution, a region having a larger stress difference than a second region as the region in which stress substitution is to be performed.

* * * * *